United States Patent [19]
Pesovic et al.

[11] Patent Number: 5,690,313
[45] Date of Patent: Nov. 25, 1997

[54] LOW NOISE WATER-CONTROL VALVE FOR HYDRAULIC AND SANITARY PIPES

[76] Inventors: Predrag Pesovic, 50 Danteova Str., 11000 Belgrade, Yugoslavia; Namanja Pesovic, 2206 Stafford Ave., Apt. C, Raleigh, N.C. 27607; Vojin Pesovic, 1188 Bishop St., Honolulu, Hi. 96813

[21] Appl. No.: 496,730

[22] Filed: Jun. 28, 1995

[30] Foreign Application Priority Data

Jun. 29, 1994 [YU] Yugoslavia ............... 417/94

[51] Int. Cl.$^6$ ............... F16D 7/02; F16K 31/44
[52] U.S. Cl. ............... 251/81; 137/454.5; 192/56.1; 251/229; 251/267; 464/41
[58] Field of Search ............... 137/454.2, 454.5, 137/454.6; 251/281, 230, 266, 267, 268; 192/54.1, 56.1, 150; 464/37, 41

[56] References Cited

U.S. PATENT DOCUMENTS

| | | | |
|---|---|---|---|
| 2,608,377 | 8/1952 | Streun | 251/81 |
| 4,468,001 | 8/1984 | Stanic | 251/268 |
| 4,778,149 | 10/1988 | Pesovic et al. | 251/267 |
| 5,060,909 | 10/1991 | Stanic | 251/267 |
| 5,406,973 | 4/1995 | Lange et al. | 251/268 |

*Primary Examiner*—George L. Walton
*Attorney, Agent, or Firm*—Horst M. Kasper

[57] ABSTRACT

A noiseless valve includes a leading spiral spindle (4) having a thread (8) at one end by which it is screwed into a spiral (8') of a piston holder (10). The piston holder (10) has a cylindrical shape and is placed into a valve body (1). The leading spiral spindle is secured by the key (13) in axial direction. A piston (12) is attached to an upper part (12) of the holder (10). The piston (16) has an edge rim with two teeth (18) cooperating with grooves (22) furnished on posts (21) of a rubber seal holder (19). The rubber seal holder (19) is attached to the valve body (1) at an end where the piston (16) stands out. The piston (16) is pressed against a rubber seal (23) placed in the rubber seal holder when the valve is closed. Two spiral teeth (6', 10'), disposed diametrically opposed and mutually shifted by 90°, are provided on a bottom head surface of the piston holder (10) and on a rim (6) of the leading spiral spindle (4). At least two spring-type teeth (14) are attached to the piston holder (10) which teeth (14) are coupled with corresponding teeth (15) furnished on an inner surface of the valve body (1). Jumping of the spring-type teeth (14) over the teeth (15) is followed by a sound furnishing a signal that the valve is sufficiently closed and open, respectively.

20 Claims, 1 Drawing Sheet

5,690,313

1

LOW NOISE WATER-CONTROL VALVE FOR HYDRAULIC AND SANITARY PIPES

BACKGROUND OF THE INVENTION

1. Field of the Invention

The invention relates to a valve with a leading spiral spindle designated for water fittings and/or sanitary fittings not causing water hammers in installations during operation of the valve.

2. Brief Description of the Background of the Invention Including Prior Art

Conventionally, there are known valves having a threaded spindle, wherein a piston of the valve is moved upon a turning of the threaded spindle. The piston bears on its top a rubber gasket, which gasket moves in an opposite direction relative to a fluid pressure and which gasket is pressed against a valve seat for closing a water flow. The drawback of such valves is that the spindle hardly turns after non-operation or after some time, and this causes frequently a locking of the valve, i.e. a seizure of the valve, and the wearing of the spindle and its threads causes faults and, finally, eliminates such valves from operation. Also, the mode of closing the valve causes uncontrolled tightening or insufficient tightening of the rubber gasket over the valve seat leading to damage of the rubber gasket, or erosion of the valve seat due to an increased rate of the fluid flow through a reduced cross-section of flow.

Furthermore, over-friction occurs between the threaded spindle and the nut, where the spindle is led through the nut. The consequences of such an increased friction include a play increase in the moving components. The play increase in the moving components in turn causes vibrations of the movable components during a flow of fluid due to the fluid pressure action. The vibrations generate water hammers that are transmitted to an entire installation. These phenomena are well known, particularly in large apartment buildings, which, among others, cause a lot of noise in such buildings.

The known passage valves, some of which will be mentioned later, operate on the principle of closing in a direction of the fluid flow. The passage valves have common drawbacks that are visible in the following: high noise level, large piston vibrations due to insufficient sealing, and, frequently, as the consequences of the formed play, uncontrolled movement, i.e. non-directional movement of fluid, which causes in turn the cavitation with all its negative consequences, complications, and large number of components, impurity settlement, reduction of flow rate, and short service life, etc.

One of the known solutions of valves is described in Yugoslavian Patent YU PS 41131, where a noiseless valve with directional fluid flow consists of a spindle housing, wherein a rotating threaded spindle is fitted, and where a piston holder is screwed over the spindle. The piston with its pin is fitted into a face opening of the holder. The piston is coupled strongly but detachably with a support via its jaws, wherein the jaws penetrate behind the piston rim. The piston is made with tiny crossed cogs and is guided by its cams within two grooves of the sleeve pulled over the piston. The piston contains an O ring seal that closes slits on the sleeve serving for a fluid flow out. A closing of the fluid flow is effected by the piston head that leans against the rubber seal.

Another well known solution of a valve is described in the patent document YU Claim P-1439/86, wherein the passage valve consists of a valve housing, where a valve seat is screwed into one side of the valve housing, and where a spiral spindle having a piston holder is screwed into the other side of the valve housing, wherein the piston fits tightly into the piston holder. The rubber ring seal is fitted on the head of a sleeve, and is supported on the valve seat. All valve components are made of plastic compound in order to avoid cavitation with is all negative consequences.

A solution is also presented in the patent document YU Claim P-31/87, where the invention refers to an improved noiseless valve, where the threaded spindle of the valve is provided with a spiral tooth set at a beginning and an end of the spindle. According to this reference, the holder is also provided with the spiral teeth at an end of the inner spiral, and these teeth cooperate with corresponding teeth when the spindle is fully screwed in. The piston holder, on its flange, is provided with opposite grooves and a three-position groove, wherein corresponding teeth enter. These teeth are provided on the base plate of the retainer that is pulled by its rim over the flange. The base plate contains also spiral teeth set in a mutually opposite position. The spiral teeth of the base plate cooperate with the spiral teeth of the spindle when the spindle is fully turned counter-clockwise, i.e. when the valve is open.

Another known solution is described in the patent document YU Claim P-2127/89, which refers to a combined valve for water-sanitary fittings, where a split piston pin is pushed through the opening of the sealing spindle, and is leaning with its flange onto the upper wall of the square opening. On the piston skirts, there are provided projections that engage the grooves made in the cylinder which is slantingly pulled over the assembly of the piston and the spindle. The sealing spindle is provided with a groove onto which a pin of circular shape is entered. According to this variant, the spiral groove is split at its beginning, while the sealing spindle is provided with a radial projection that enters the spiral groove.

SUMMARY OF THE INVENTION

1. Purposes of the Invention

It is an object of the present invention to provide a valve providing a rotation of a spiral spindle at opening and closing without any locking within a piston holder even after some time of non-operation of the valve, while securing at the same time a maximum flow rate of a fluid.

It is another object of the present invention to provide a valve not causing any water hammers in an installation and thereby causing noise during water flow.

It is a further object of the present invention to provide a valve preventing any deposition of mechanical impurities on sealing surfaces of a valve seat or a possible clogging of the sealing surfaces.

It is yet another object of the present invention to provide a valve meeting the requirements for a long service life and for elements experiencing wear at a decreased rate.

These and other objects and advantages of the present invention will become evident from the description which follows.

2. Brief Description of the Invention

The present invention provides for a valve with a guiding or leading spiral spindle. The guiding spiral spindle is inserted into a piston holder hole, disposed centered in a piston holder. The piston holder in turn is positioned in a valve body. A piston is attached to a closed end of the piston holder. A valve seat holder is attached at an open end of the valve body, where the piston is located. The piston presses the valve during closing against a rubber seal supported in the valve seat holder. The guiding spiral spindle has a bottom rim with a diametrically oppositely disposed thread cooperating with a spiral of the piston holder hole. The guiding spiral spindle is secured with a key against falling out. The piston is provided with two teeth, disposed circumferentially, which teeth are guided in grooves provided on the valve seat holder. The piston holder contains at least two spring-type teeth that are coupled with corresponding teeth provided on an inner circumferential surface of the valve body, which secures a retreat of the piston holder and opening of the valve, i.e. which prevents an over-tightening of the valve upon its closing.

The novel features which are considered as characteristic for the invention are set forth in the appended claims. The invention itself, however, both as to its construction and its method of operation, together with additional objects and advantages thereof, will be best understood from the following description of specific embodiment when read in connection with the accompanying drawing.

BRIEF DESCRIPTION OF THE DRAWING

In the accompanying drawing, in which is shown one of the various possible embodiments of the present invention.

DESCRIPTION OF INVENTION AND PREFERRED EMBODIMENT

Figure 1:
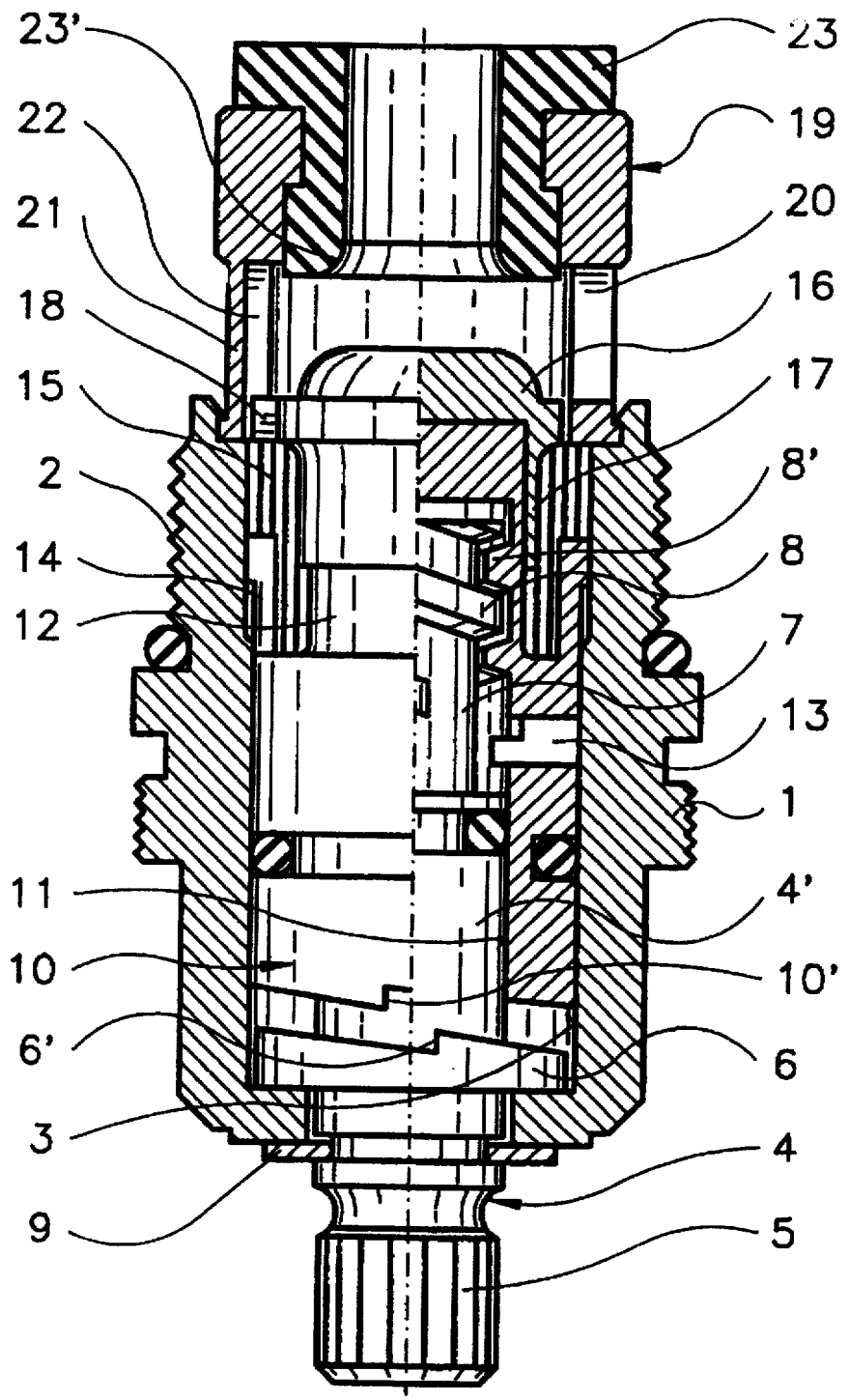
FIG. 1 is a partial cross-section of a valve (right-hand side) and a partially opened elevational view (left-hand side).

The enclosed figure shows a valve representing the invention consisting of a valve body 1 with a thread 2 adapted to standard fittings. A piston holder 10 is inserted into a borehole 3, made centrally in the valve body 1. The piston holder 10 has a cylindrical shape closed at one end thereof, to which end a piston valve 16 is attached. A leading spiral spindle 4 is fitted in the piston holder 10. At a free end of the leading spiral spindle 4 there is disposed a pin 5, wherein the pin 5 is grooved so that it firmly and safely bears the handle for opening/closing of the valve, which handle is not shown here. A groove for a retainer-circlip 9 is provided above the pin 5, and then a rim 6 and a spindle neck 4' are furnished. The circlip 9 secures the leading spiral spindle from an axial shifting. At the other end of the leading spiral spindle 7 forming a bottom rim, there is provided a (left) thread 8 that cooperates with a spiral 8', located on a wall of a lower part of a piston holder hole 11. The leading spiral spindle 4 is secured against falling out in the piston holder 10 by a key 13 that passes through a wall of the holder 10. The rim 6, with its bottom surface, leans against the valve body 1. Two first spiral teeth 6', disposed diametrically opposite and mutually shifted by 90°, are provided on an upper surface of the rim 6.

The piston holder 10 is tapered in the zone of the spiral 8', and at least two spring-type teeth are radially extending in this zone (designated with the reference numeral 14), and these teeth 14 on piston valve 16 are coupled with corresponding teeth 15 provided on the valve body 1. The teeth 14 and 15 are formed tangentially, so that the teeth 14 are slipping over the teeth 15 upon a motion of the piston holder 10 upward and toward a closing position. Thus, an over-tightening of the valve is prevented, i.e. a slip-friction of the teeth 14 and of the teeth 15 is possible in en open position or in a closed position. The teeth 14 and the teeth 15 are coupled when the valve is being opened and the withdrawal of the piston holder 10 downwardly is secured, and the opening of the valve is secured by the coupling of the teeth 14 and the teeth 15.

Second spiral teeth 10', shifted by 90° relative to each other, are provided diametrically opposite on the bottom head surface of the holder 10. The second spiral teeth 10' are co-acting with the first spiral teeth 6' on the rim 6 during valve opening/closing. The first spiral teeth 6' and the second spiral teeth 10' prevent a locking of the valve during a closing the valve. An upper part 12 of the piston holder 10 has a smaller diameter. The upper part 12 enters into a hole of a cylindrical stream 17 of the piston valve 16 and furnishes a support of the piston valve 16.

A rubber seal holder 19 is located on the upper circumferential surface of the valve body 1. A valve seat 23 is inserted into the rubber seal holder 19. Two mutually symmetrical wide openings 20 are provided in a bottom part of the rubber seal holder 19. Grooves 22 are provided on an inner side, in axial direction, in posts 21 of the valve seat holder 19, wherein the posts 21 and the rubber seal holder 19 are formed in this way. Piston teeth 18 are accommodated with the grooves 22, wherein the piston teeth 18 can slip relatively to the grooves 22. The piston teeth 18 are provided on an edge rim of the piston 16 diametrically oppositely located against each other. The rubber seal 23 with the seat 23' faces towards the piston valve 16.

The mode of functioning of the spiral spindle-piston valve holder/valve seat-holder assembly, which is the object of this invention, is as follows:

After screwing the leading spiral spindle 4 into the piston holder 10, the assembly is to be secured by the key 13. The assembly obtained in this way is completed and placed into the valve body 1. The valve opens by turning the pin 5, i.e. the spindle 4, in a counter-clockwise direction, and the leading spiral spindle pulls the piston holder 10 downward in an axial direction with the aid of the spiral 8' and the thread 8. The water pressure acts on head of the piston valve 16 and pushes the piston 16 uniformly downwardly at the moment of the actuation of the piston holder 10. The piston valve 16 is led by teeth 18 in the grooves 22 provided on the poets 21 of the valve seat holder 19. The piston holder 10 travels down the spindle 4 until the second spiral teeth 10' engages the first spiral teeth 6'. In this stage of opening, the teeth 14 and 15 are coupled, which causes a translatory motion of the piston holder 10 downwardly, by which the opening of the valve is effected.

The procedure of functioning is opposite during the actuation of the valve and setting it into the closed position, and the teeth 14 are coupled with the teeth 15 furnished on the body 1 and the teeth 14 and the teeth 15 begin to slip at ultimate positions. Jumping of the teeth 14 over the teeth 15 prevents an overtightening of the valve.

In the event of opening as well as in the event of closing the valve, a jumping of the teeth 14 over the teeth 15 is also followed by a sound, thereby providing a signal when the valve is sufficiently closed and opened, respectively.

It will be understood that each of the elements described above, or two or more together, may also find a useful application in other types of valves differing from the types described above.

While the invention has been illustrated and described as embodied in the context of a valve with a leading spiral spindle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A valve (1) for water-sanitary fittings, which does not cause water hammers within an installation comprising a piston holder (10) of a piston (16) screwed on a spiral (8) of a spindle (4);

at least two teeth (14) coupled with corresponding teeth (15) on the valve body (1), and provided on the piston holder (10) in the zone of the spiral (8), a first tooth (6') is disposed on the rim (6) of the spindle (4);

a second tooth (10') disposed on the bottom head surface of the piston holder (10), so that the first tooth (6') and the second tooth (10') are mutually engaged together when the valve is in a fully opened position to provide the two teeth (14) to furnish a slipping motion and sound to prevent overwinding of the valve;

wherein the spindle (4) is secured in the piston holder (10), in an axial direction, by a key (13) which passes through the piston holder (10) wall;

two diametrically opposite teeth (18) provided on a rim portion of the piston valve (16), with a shank of the piston valve (16) positioned on the upper part (12) of the piston holder (10) and defined by slip and longitudinally guided position in at least one groove (22), provided on the posts (21) of the valve seat holder (19) of the rubber seal (23), wherein said teeth (18) are guided within the at least one groove (22) provided in the valve seat holder (19), when the valve is moved to an open position and said tooth (18) slip within the at least one groove (22) when the piston valve (16) is seated on the seat (23) to prevent overtightening of the piston valve (16) against the seat (23').

2. The valve for preventing water hammers according to claim 1, wherein at least one type of the teeth (14) and the corresponding teeth (15) is flexible;

wherein the at least two teeth (14) and the corresponding teeth (15) prevent a slip coupling as the valve is moved beyond at least one of an open position and a closing position;

wherein the at least two teeth (14) and the corresponding teeth (15) will produce a click sound when the valve is moved while being in at least one of an open position and of a closed position;

wherein the at least two teeth (14) and the corresponding teeth (15) prevent an overtightening in at least one of an open position and a closed position;

wherein the teeth (18) and the groove (22) provides a guide for a translating motion when the spindle is rotated.

3. The valve for preventing water hammers according to claim 1 wherein the seat (23') is disposed at the rubber seal (23), wherein the valve is open when the piston valve (16) is disposed remote from the seat (23'); and wherein the valve is closed when the piston valve (16) engages the seat (23');

wherein the at least two teeth (14) and the corresponding teeth (15) engage such that slipping action occurs when the piston valve (16) gets to a limiting position.

4. The valve for preventing water hammers according to claim 1, wherein the spiral (8') and the thread (8) convert a rotary motion of the spindle (4) into a translatory motion of the piston valve (16).

5. A valve preventing water hammers within a water-sanitary installation comprising a valve body having a cylindrical shape and provided with teeth made at an inner surface of the valve body;

a piston holder having a cylindrical shape closed at a first end, wherein the piston holder is inserted movably in an axial direction into the valve body;

a spiral furnished in and enclosed by an inner wall of the piston holder in a region of the first end;

second spiral teeth shifted by 90° in relation to each other and furnished on a bottom head surface placed at a second end of the piston holder and enclosed by the piston holder;

at least two spring-type teeth coupled with the teeth of the valve body and enclosed by the piston holder to prevent overwinding of the valve;

a leading spiral spindle provided with a thread at a first end and provided with a rim having a first spiral teeth shape matching the second spiral teeth of the piston holder, wherein the leading spiral spindle is inserted rotatably into the piston holder and is screwed into the spiral of the piston holder by means of the thread of the leading spiral spindle;

a valve seat holder enclosing a rubber seal, wherein the valve seat holder is attached to the valve body and is provided with grooves furnished in an inner wall of the valve seat holder;

a piston valve attached to the first end of the piston holder and provided with piston teeth cooperating with at least one groove of the valve seat holder, wherein the piston valve moves towards the valve seat holder during a closing of a valve and wherein said piston teeth slip within the at least one groove when the piston valve is seated on a seat of the rubber seal to prevent overtightening of the piston valve against the seat; and a key passing through a piston holder wall securing the leading spiral spindle against falling out from the piston holder.

6. A valve for preventing water hammers within a water-sanitary installation comprising a valve body having an outer cylindrical surface, an inner cylindrical surface, said valve body having a first axial end and a second axial end;

a piston holder having an outer cylindrical surface and an inner cylindrical surface, with an inner spiral thread on the inner cylindrical surface of the piston holder, a first axial end, and a second axial end, wherein the piston holder is inserted in an axial direction into the valve body such that the first axial end of the piston holder is disposed inside the first axial end of the valve body and such that the second axial end of the piston holder is disposed inside the second axial end of the valve body;

a spindle disposed inside the inner cylindrical surface of the piston holder and having an outer spiral thread for engaging the inner spiral thread of the piston holder, wherein the spindle is inserted rotatably into the piston holder end is screwed into the inner spiral thread of the piston holder by means of the thread of the spindle;

a rim attached to the spindle;

a first spiral tooth attached to a first axial face of the rim;

a second spiral tooth attached to an axial face of the second axial end of the piston holder, and disposed facing the first spiral tooth attached to the rim;

two inner teeth disposed on the inner cylindrical surface of the valve body and projecting inwardly from the cylindrical surface of the valve body;

two outer teeth disposed on the outer cylindrical surface of the piston holder, wherein the inner teeth and the outer teeth are disposed such as to engage each other upon rotation of the piston holder in the valve body and such as to furnish a slipping motion sound when no further common rotation of the valve body and of the piston holder occurs and a relative end position of the valve body and of the piston holder has been reached while an overtightening of a piston valve against a seat is prevented.

7. The valve for preventing water hammers according to claim 6, further comprising an inner seal ring;

a collar attached to the first axial end of the valve body and serving as a valve seat holder for supporting the inner seal ring, wherein the valve seat holder is attached to the valve body.

8. The valve for preventing water hammers according to claim 7, further comprising an annular inner projection disposed on an inner wall of the collar for defining a position of the inner seal ring.

9. The valve for preventing water hammers according to claim 7, wherein the inner seal ring is a rubber seal ring.

10. The valve for preventing water hammers according to claim 7, further comprising a piston valve attached to the first axial end of the piston holder and movable in an axial direction of the valve body, wherein the piston valve moves towards the valve seat holder during a closing of a valve.

11. The valve for preventing water hammers according to claim 4, further comprising an angle position defining element disposed on an inner wall of the collar; and an angle position defining element disposed on an outer periphery of the piston valve for engaging the angle position defining element disposed on the inner wall of the collar.

12. The valve for preventing water hammers according to claim 11, wherein the angle position defining element disposed on the inner wall of the collar includes a groove extending in an axial direction of the valve;

wherein the angle position defining element disposed on an outer periphery of the piston valve includes a tooth.

13. The valve for preventing water hammers according to claim 11, wherein the angle position defining element disposed on the inner wall of the collar includes a plurality of grooves extending in an axial direction of the valve;

wherein the angle position defining element disposed on the outer periphery of the piston valve includes a plurality of teeth.

14. The valve for preventing water hammers according to claim 11, further comprising a key protruding from the inner cylindrical surface of the piston holder.

15. The valve for preventing water hammers according to claim 6, further comprising a shifted first spiral tooth attached to the first axial face of the rim and shifted by 90 degrees relative to the first spiral tooth;

a shifted second spiral tooth attached to the axial face of the second axial end of the piston holder, end disposed facing the first spiral teeth attached to the rim and shifted by 90 degrees relative to the second spiral tooth.

16. The valve for preventing water hammers according to claim 6, wherein one group of a group of the inner teeth and of a group of the outer teeth is made of an elastic material.

17. The valve for preventing water hammers according to claim 6, further comprising a third inner tooth disposed on the inner cylindrical surface of the valve body;

a third outer tooth disposed on the outer cylindrical surface of the piston holder, wherein the third inner tooth and the third outer tooth are disposed such as to engage the inner teeth present and, respectively, the outer teeth present upon rotation of the piston holder in the valve body.

18. The valve for preventing water hammers according to claim 6, further comprising a thread disposed on the outer cylindrical surface of the valve body, wherein the thread is adapted to match standard water fittings;

wherein the piston holder is closed at its first end;

a pin with grooves disposed parallel to a valve axis attached to an end of the spindle for firmly and safely supporting a handle;

a circlip surrounding the pin for defining an axial position of the spindle relative to the valve body;

a groove disposed above the pin on the spindle for being engaged by the circlip.

19. The valve for preventing water hammers according to claim 6, wherein the inner teeth are coupled to the outer teeth;

wherein the inner teeth and the outer teeth are constructed tangentially so that the inner teeth are slipping over the outer teeth upon a motion of the piston holder beyond a closing position, and wherein a noise is generated by the slipping teeth to prevent an overtightening.

20. The valve for preventing water hammers according to claim 6, wherein the inner teeth and the outer teeth are coupled during an opening motion of the piston holder, which causes a translational motion of the piston holder in a direction of its second axial end.

* * * * *

UNITED STATES PATENT AND TRADEMARK OFFICE
CERTIFICATE OF CORRECTION

PATENT NO. : 5,690,313

DATED : November 25, 1997

INVENTOR(S) : Predrag Pesovic, Nemanja Pesovic, Vojin Pesovic

It is certified that error appears in the above-identified patent and that said Letters Patent is hereby corrected as shown below:

Title Page under (76):

delete "Namanja" and insert --Nemanja--

Signed and Sealed this

Fourth Day of August, 1998

Attest:

BRUCE LEHMAN

Attesting Officer

Commissioner of Patents and Trademarks